(12) United States Patent
Magnet et al.

(10) Patent No.: US 9,403,527 B2
(45) Date of Patent: Aug. 2, 2016

(54) METHOD FOR CONTROLLING A HYBRID AUTOMOTIVE VEHICLE AND HYBRID VEHICLE ADAPTED TO SUCH A METHOD

(75) Inventors: Christophe Magnet, Lyons (FR); Michael Millet, Moidieu Detour (FR)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 13/885,425

(22) PCT Filed: Dec. 9, 2010

(86) PCT No.: PCT/IB2010/003476
§ 371 (c)(1),
(2), (4) Date: May 15, 2013

(87) PCT Pub. No.: WO2012/076928
PCT Pub. Date: Jun. 14, 2012

(65) Prior Publication Data
US 2013/0245874 A1    Sep. 19, 2013

(51) Int. Cl.
*B60W 20/00* (2016.01)
*B60K 6/48* (2007.10)
*B60W 10/06* (2006.01)
(Continued)

(52) U.S. Cl.
CPC ............... *B60W 20/00* (2013.01); *B60K 6/48* (2013.01); *B60W 10/06* (2013.01); *B60W 10/08* (2013.01); *B60W 10/26* (2013.01); *B60W 20/11* (2016.01); *B60W 30/192* (2013.01); *B60W 40/12* (2013.01); *B60W 2510/246* (2013.01); *B60W 2530/14* (2013.01); *B60W 2550/12* (2013.01); *B60W 2550/402* (2013.01); *B60Y 2200/14* (2013.01);
(Continued)

(58) Field of Classification Search
None
See application file for complete search history.

(56) References Cited

U.S. PATENT DOCUMENTS 6,057,671 A * 5/2000 Kuno .......................... 320/130
6,118,237 A * 9/2000 Kikuchi et al. ............... 318/139
(Continued)

FOREIGN PATENT DOCUMENTS

DE    102008040916 A1    2/2010
EP       2020724 A1    2/2009
(Continued)

OTHER PUBLICATIONS

International Search Report (May 4, 2011) for corresponding International application No. PCT/IB2010/003476.
(Continued)

*Primary Examiner* — Rami Khatib
*Assistant Examiner* — Navid Ziaeianmehdizadeh
(74) *Attorney, Agent, or Firm* — WRB-IP LLP

(57) ABSTRACT

A method is provided for controlling a hybrid automotive vehicle equipped with an internal combustion engine, and an electric machine connected to an energy storage system includes a) during a mission of the vehicle, estimation of the temperature of the energy storage system at the beginning of a next mission of the vehicle, and b) if the temperature estimated at step a) is below a threshold value, recharging, before the end of the current mission (If the vehicle, the energy storage system on the basis of the temperature estimated at step a). In a step c), if the energy storage system has been recharged at step b), then, at the beginning of the next operating period of the vehicle, the energy storage system is heavily discharged. With this method, the battery rapidly reaches the desired temperature when driving off again at the beginning of the next mission.

21 Claims, 2 Drawing Sheets

(51) Int. Cl.
    *B60W 10/08*     (2006.01)
    *B60W 10/26*     (2006.01)
    *B60W 30/192*    (2012.01)
    *B60W 40/12*     (2012.01)

(52) U.S. Cl.
    CPC .......... *Y02T 10/6221* (2013.01); *Y02T 10/6291* (2013.01); *Y10S 903/903* (2013.01)

(56) References Cited

U.S. PATENT DOCUMENTS

| | | | |
|---|---|---|---|
| 6,163,135 A * | 12/2000 | Nakayama et al. | 320/150 |
| 6,232,748 B1 * | 5/2001 | Kinoshita | 320/132 |
| 6,408,968 B1 * | 6/2002 | Wakashiro et al. | 180/65.26 |
| 6,522,959 B1 * | 2/2003 | Sawamura et al. | 701/22 |
| 6,608,482 B2 * | 8/2003 | Sakai et al. | 324/426 |
| 6,870,336 B2 * | 3/2005 | Murakami et al. | 318/432 |
| 7,015,676 B2 * | 3/2006 | Kohama et al. | 320/150 |
| 7,234,552 B2 * | 6/2007 | Prema et al. | 180/65.29 |
| 8,417,403 B2 * | 4/2013 | Iida et al. | 701/22 |
| 8,479,850 B2 * | 7/2013 | Nakata | 180/65.29 |
| 2003/0088343 A1 * | 5/2003 | Ochiai et al. | 701/22 |
| 2004/0012206 A1 * | 1/2004 | Wakashiro et al. | 290/40 C |
| 2007/0210742 A1 * | 9/2007 | Brecht | 320/104 |
| 2008/0012535 A1 * | 1/2008 | Takatsuji et al. | 320/150 |
| 2008/0036421 A1 * | 2/2008 | Seo et al. | 320/132 |
| 2011/0288704 A1 * | 11/2011 | Schwarz et al. | 701/22 |
| 2013/0138286 A1 * | 5/2013 | Sawayama | 701/22 |
| 2013/0211650 A1 * | 8/2013 | Tashiro et al. | 701/22 |

FOREIGN PATENT DOCUMENTS

| | | |
|---|---|---|
| JP | 11355967 | 12/1999 |
| JP | 2000092614 | 3/2000 |
| JP | 2004245190 | 9/2004 |
| JP | 2008049877 | 3/2008 |
| JP | 2009078807 | 4/2009 |
| JP | 2009273326 | 11/2009 |

OTHER PUBLICATIONS

Japanese Official Action (Jun. 25, 2014)(translation) for corresponding Japanese Application 2013-542618.
Japanese Official Action (Apr. 6, 2015)(translation) for corresponding Japanese Application 2013-542618.

* cited by examiner

METHOD FOR CONTROLLING A HYBRID AUTOMOTIVE VEHICLE AND HYBRID VEHICLE ADAPTED TO SUCH A METHOD

BACKGROUND AND SUMMARY

The invention relates to a method for controlling a hybrid automotive vehicle equipped with an internal combustion engine and an electric machine. The invention also concerns a hybrid automotive vehicle adapted to perform such a method.

Hybrid electric automotive vehicles, such as trucks, are equipped with energy storage systems which in many cases comprise one or several electrochemical batteries. The temperature of these batteries must be in a predefined operating interval to work properly. Batteries with too cold a temperature are not able to deliver enough electrical power, due to an increased internal resistance. In case a truck has to move after being parked in a cold place for several hours, the vehicle may lack electrical energy, or more precisely may lack the ability to deliver enough electrical power at the beginning of the operating, period of the vehicle, which can affect the electric traction machine and/or electrically powered auxiliary equipments, such as lights or air conditioning system.

To avoid such issues, it is known to warm-up the battery prior to moving the vehicle, in order to permit the battery to deliver enough electrical current. Known battery warning techniques use auxiliary warming devices that induce a fuel over-consumption.

It is also known from JP-2004/245190 to perform, at the end of an operating period of a vehicle, a recharging step of the battery in order for it to be able to start the internal combustion engine at the beginning of the next operating period. This technique aims at making sure that the battery has enough energy to start the engine, taking into account the self discharge of the battery, but it does not guarantee that the battery has reached a temperature high enough to feed the electrical equipment of the vehicle with the right amount of electrical power when the engine is started again.

In a hybrid vehicle, if the batteries are not able to deliver enough electrical power supply to the electric traction machine, the internal combustion engine will be required to deliver a bigger proportion of the torque needed by the driveline to meet the requirement by the driver, which increases the fuel consumption. In addition, if available electrical power from the batteries is limited, it may affect other electrical consuming systems onboard the vehicle. Also, if the batteries are cold, it also affects the electrical power which they can absorb, for example during a regenerative braking of the vehicle. Due to this, the friction brakes of the vehicle will be required to dissipate more energy during a given braking phase, energy which will not be recovered and will result in further increased fuel consumption.

The invention aims, according to an aspect thereof at proposing a new method for controlling a hybrid automotive vehicle which promotes heating up the energy storage system of the vehicle without using auxiliary warming devices, or at least significantly reducing the need for such devices, thus allowing to provide as soon as possible an optimum level of available electrical power to the vehicle.

To this end, an aspect of the invention concerns a method for controlling a hybrid automotive vehicle, equipped with an internal combustion engine and an electric machine connected to an energy storage system, each of said internal combustion engine and said electric machine being adapted to deliver torque to a driveline of the vehicle. This method is characterized in that it comprises at least the following steps:

a) during a mission of the vehicle, estimation of the temperature of the energy storage system at the beginning of the next mission of the vehicle, b) if the temperature estimated at step a) is below a threshold value, recharging, before the end of the current mission of the vehicle, the energy storage system on the basis of the temperature estimated made at step a);

c) if the energy storage system has been recharged at step b), then, at the beginning of the next operating period of the vehicle, heavily discharging the energy storage system.

Thanks to aspects of the invention, a cold temperature, which may prevent the battery from property functioning at a later stage, is forecast and a certain amount of electrical energy is stored in the battery before the end of the mission of the vehicle. This amount of electrical energy is used at the beginning of the next mission of the vehicle to heat the energy storage system by Joule effect obtained by a heavy discharge of the battery, using the self heating of the battery due to its increased internal resistance at lower temperatures. This allows the battery to more quickly reach a temperature at which it can exchange more electrical power with the vehicle's electrical systems, especially with the electrical machine 4.

According to further aspects of the invention which are advantageous but not compulsory, such a method may incorporate one or several of the following features:

- If the temperature estimated at step a) is below the threshold value then the energy storage system is recharged at step b) with a state of charge higher than a normal operating state of charge target used when the temperature estimated at step a) is above the threshold value.
- At step c), the energy storage system is discharged by reducing the ratio between the torque delivered to the driveline by the internal combustion engine and the torque delivered to the driveline by the electric machine.
- The method comprises after step c), further steps of:
- d) measuring or estimating the temperature of the energy storage system.
- e) if the temperature measured or estimated at step d) is superior to a threshold temperature value, adjusting a state of charge level target of the energy storage system to a normal value.
- At step b), recharging of the energy storage system is performed by progressively increasing a state of charge SOC target of the energy storage system.
- At step b), the ratio between the torque delivered to the driveline by the internal combustion engine and the torque delivered to the driveline by the electrical machine is increased, and whereas a given amount of the torque delivered by the internal combustion engine is converted by the electrical machine into electrical energy and stored in the energy storage system.
- At step a), the estimation is made on the basis of weather forecast data.
- At step a), the estimation is made on the basis of weather statistic data.
- The method comprises, prior to step b), a further step of:
- f) determination if the mission of the vehicle is about to end.
- At step f), determination is made by geographically locating the vehicle with respect to a predefined trip.
- At step f), determination is made by comparing the distance covered by the vehicle during the current mission to an average amount of distance covered during previous missions of the vehicle.
- At step f), determination is made by a device triggered by the driver of the vehicle. This invention also concerns a hybrid automotive vehicle equipped with an internal combustion engine and an electric machine connected to an energy storage system, each of said internal combustion engine and said electric machine being adapted to deliver torque to a driveline of the vehicle. This vehicle is characterized in that it comprises means to estimate, during a mission of the vehicle, the temperature of the energy storage system at the beginning of a next mission of the vehicle, means to charge, before the end of the current mission of the vehicle and if the temperature estimation is below a threshold value, the energy storage system on the basis of the temperature estimation, and means to heavily discharge the energy storage system at the beginning of the next mission of the vehicle.

According to further aspects of the invention which are advantageous but not compulsory, such a vehicle may incorporate one or several of the following features:

- The vehicle comprises an electronic control unit adapted to control a state of charge target of the energy storage system.
- The electronic control unit is adapted to control the ratio between the torque delivered to the driveline by the internal combustion engine and the torque delivered to the driveline by the electric machine.
- The vehicle comprises a temperature sensor adapted to measure the temperature of the energy storage system.
- The vehicle comprises means to determine if the mission of the vehicle is about to end.

BRIEF DESCRIPTION OF THE DRAWINGS

The invention will now be explained in correspondence with the annexed figures and as an illustrative example, without restricting the invention. In the annexed figures.

DETAILED DESCRIPTION

Figure 1:
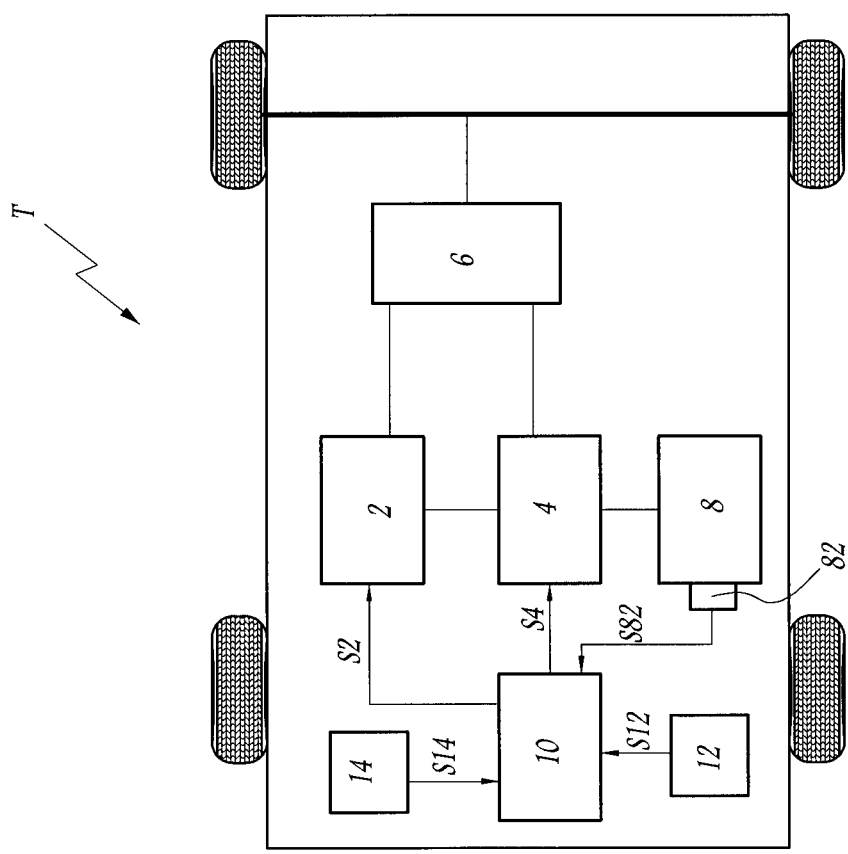
FIG. 1 is a schematic representation of a truck embodying the invention.
Figure 2:
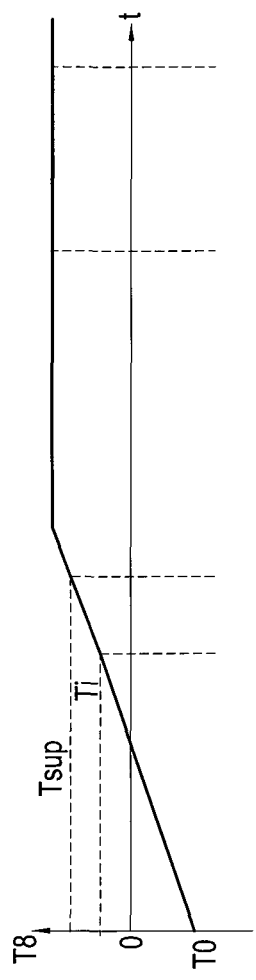
FIG. 2 is a temperature versus time chart of the temperature in an energy storage system of the truck of FIG. 1.

Represented on FIG. 1 is a vehicle, for example a truck T, comprising an internal combustion engine 2 and an electrical machine 4. Each of internal combustion engine 2 and electric machine 4 is adapted to deliver torque to a driveline 6 of truck T. In other words, the hybrid vehicle is a parallel-type hybrid electric vehicle. The driveline could be in two parts, separate for the engine 2 and the electrical machine 4, for example with one of them driving a first axle and the other driving a second axle or set of axles.

Electric machine 4 is electrically connected to an energy storage system comprising for example an electrochemical battery 8. The electric machine 4 can be reversible, in which case it is also able to convert mechanical torque into electrical energy to be stored in battery 8, the mechanical torque being retrieved directly from the internal combustion engine 2 and/or from the driveline.

Very schematically, truck T comprises an electronic control unit 10 adapted to control internal combustion engine 2 and electrical machine 4 with respective electronic signals S2 and S4. Thanks to signals S2 and S4, electronic control unit 10 is adapted to control directly or indirectly the amount of torque delivered or retrieved by each of internal combustion engine 2 and electric machine 4. Electrical control unit 10 can thereby control the speed of internal combustion engine 2 and can also control the electrical power absorbed/delivered by electric machine 4 from/to battery 8. It is quite common in the field of hybrid, vehicles to have a control unit 10 which may implement several control strategies. Some of these strategies can be centred on seeking to maintain the state of charge SOC of the battery 8 within a predefined window around a state of charge target SOCT. The state of charge target Or target window can be dependent on various parameters, including vehicle speed, vehicle weight, battery state of health, etc. . . . . . One easy way to modify at least partly the strategy is to change the state of charge target or target window and/or to change the way it is determined. For example, if the state of charge target is defined by a formula depending on a certain number of parameters, a change of strategy can be obtained by giving a fixed predetermined value to the state of charge target or target window, or by modifying the formula by which it is determined. In any case, modifying a state of charge target or a state of charge target window will be equivalent.

Battery 8 may be equipped with one or several temperature sensors 82 adapted to send to electric control unit 10 an information related to the temperature of battery 8, thanks to an electronic signal S82. Temperature sensor 82 is represented as being unitary for the understanding of the drawing. However, several temperature sensors may be installed at each equipped with a dedicated temperature sensor. Rather than being directly measured, the battery temperature can be estimated.

For the battery to deliver its nominal performance, the temperature T8 of battery 8 must be comprised within a given interval, in which efficient charging and discharging may occur. For example, 35° C. can be an optimal temperature for battery 8.

In case truck T is parked in a very cold place, temperature T8 can become inferior to a temperature threshold Ti, under which battery 8 is not able to be charged and discharged correctly. In such a case, the method according to the invention is performed in order to heat up battery 8 so that its temperature T8 may be increased, and hopefully exceeds temperature threshold Ti.

The method according to the invention is performed as follows. It is assumed that the truck is operated for a given mission for which it can be determined a start of the mission and an end of the mission. The period between two consecutive missions, hereinafter the off-mission period, is a period where the vehicle is left non-operating for a sufficient amount of time for its batteries to reach a temperature near the ambient temperature, outside the vehicle, which itself can vary in the meantime. The minimum duration of an off-mission period may vary a lot, especially depending on the difference between the battery temperature at the end of the previous mission and the ambient temperature, depending on the thermal inertia of the battery, etc. . . . The minimum duration of an off-vehicle mission is typically in the order of one hour. Therefore, during a mission, the various components of the vehicle, and especially its internal combustion engine, may be stopped and started several times, but each non-operating period would be of a too short duration for the battery temperature to fall below a given threshold. For a long-haul truck, the mission can be considered for example to cover the full working day of a driver, including momentary rest periods of the driver, except in very cold weathers. For a delivery vehicle, a mission can be considered as covering the full journey of the vehicle from its leaving of a base station to its return to that base station. In the course of a mission, the truck May be operating, or non-operating, but non-operating periods do not last long enough to allow the batteries too see their temperature fall below a predefined threshold.

During an operating period of truck T in the course of a mission, the battery 8 is usually maintained at a state of charge SOC which varies around a normal operating state of charge target, or SOCTn, which can be for example equivalent to 40% of the nominal capacity of battery 8. Normal state of charge SOCTn is maintained during a major portion of the operating period of truck T. As mentioned above, the normal state of charge SOCTn can be dependent on a number of factors, including factors which may change during the mission, such as the vehicle speed or the vehicle weight.

During the mission, temperature T8 at the beginning, of a next mission is estimated. This is done by an electronic estimation device 12 adapted to communicate with electronic control unit 10 thanks to an electronic signal S12. In an embodiment, estimation device 12 may comprise components adapted to receive weather related information and forecasts concerning the place truck T will be in at the end of its mission. Estimation device 12 can also receive statistic data concerning geographical temperatures related to the season and time, on the basis of historical data. On the basis of this information, estimation device 12 estimates the temperature at which battery 8 will be at the beginning of the next mission and sends this temperature information to electronic control unit 10. Preferably, the temperature estimation should take into account other elements which may influence the temperature of the battery, such as the fact that the vehicle is usually parked in sheltered place If estimation device 12 forecasts a temperature inferior to threshold temperature Ti, battery 8 will have to be warmed up at the beginning of the next mission. Threshold temperature Ti may vary, for example depending on the type of battery, and may be set between 5 and 15° C. for example for a lithium-ion battery.

Several possibilities exist as how to determine that truck T approaches the end of its mission. As a first example, the truck may be equipped with an electronic device 14 adapted to geographically locate truck T, for example comprising a satellite positioning system, which may be coupled to a navigation system where the path of the truck for the corresponding mission, or only its final destination for the mission, has been entered. With this geographic location, device 14 can determine if truck T approaches its destination. In some applications, where the truck always comes back to a predefined location at the end of a mission, it may be sufficient for the electronic, device 14 to detect if truck T approaches its usual parking place or garage.

Electronic device 14 can also measure the amount of distance that truck T has covered during the mission. Electronic device 14 can be adapted to compare this distance to the average distance covered by truck T on previous missions and to determine approximately if the mission of truck T is about to end.

The upcoming end of the mission can also be signalled by the driver, for example by triggering of a dedicated device, at a given time before the actual end of the operating period. Such a device can be, for instance, a pushbutton on the dashboard in the cabin of truck T which the driver is asked to trigger for example 15 minutes before the end of a mission. In some applications, a mission can be considered as a day's work, so that it can be considered that a mission is about to end at a certain time of the day and that a new mission is going to start the next day.

Preferably, estimation of the end of mission would involve combining several criteria to enhance the reliability of the prediction. Other parameters than those mentioned above may include the time elapsed since the start of the mission, information about goods or passengers carried, by the vehicle, etc. . . .

In an embodiment of the invention, if the end of the mission is about to occur, electronic device 14 may be programmed to send to electronic control unit 10 an electronic signal S14. Once electronic control unit 10 receives this signal, a charging process of battery 8 is initiated by electronic control unit 10 at a time t1. It can be mentioned that the role of the electronic control units 10 and 14 can be split between several physical units, including more than two physical units, or could be joined in one single physical electronic control unit.

Figure 3:
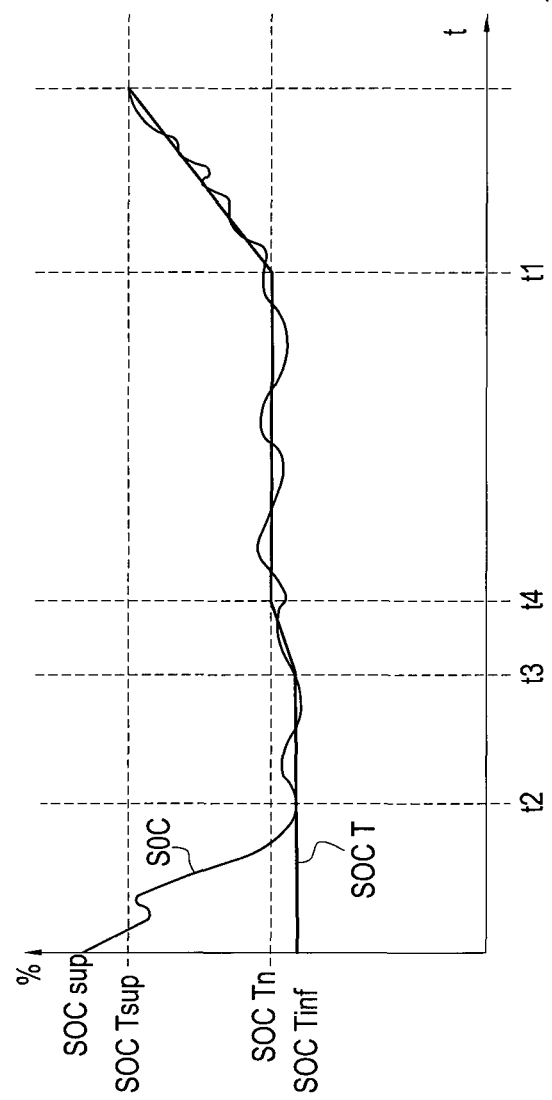
FIG. 3 is a state of charge versus time chart representing a method according to the invention.

To recharge battery 8, electronic control unit 10 may set a modified state of charge target SOCTsup. In order to prevent a sudden change in the operation of the truck, which would lead to some electric equipment of truck T lacking electrical energy, the charge of battery 8 is preferably done a progressive manner, by progressively increasing state of charge target SOCT from the normal level SOCTn to the modified level SOCTsup. This is exemplified by the increasing linear curve on FIG. 3. The Soc target increase could be done by steps. The goal of this charge of battery 8 is to increase the state of charge of the battery from a level varying around SOCTn to a higher level varying around a higher state of charge target SOCTsup, which can be comprised between 65 and 70% of the nominal capacity of battery 8. Level of state of charge target SOCTsup may be set on the basis of a number of parameters, for example including on the temperature estimation S12 made by estimation device 12. It could also be a predetermined value. Level of target SOCTsup should preferably be set to store enough energy to permit that the discharge of battery 8 at the beginning of the next mission induces a sufficient temperature increase.

To charge battery 8, several strategies can be implemented by electronic control unit 10, alternatively or in combination. For example, one strategy involves increasing the ratio between the torque delivered to driveline 6 by internal combustion engine 2 and the torque delivered by electric machine 4 to driveline 6. The torque delivered by electric machine 4 to driveline 6 is reduced so that it retrieves less energy from the battery 8. According to another strategy, it is possible to charge battery 8 with a portion of the torque delivered by internal combustion engine 2, by converting such torque into electric energy by electric machine 4 and storing it into battery 8.

During an off-mission period of truck T, which can be for example at the night, temperature T8 may decrease to a low temperature T0, which is inferior to threshold temperature Ti. In case truck T operates in very cold regions, temperature T8 can, for example, reach −20° C., a temperature at which operation of battery 8 is not efficient. When truck T is started, the state of charge target of battery 8 may be set to a low level SOCTinf, which is preferably lower than a normal operation state of charge target, for example comprised between 30 and 35% of the nominal capacity of battery 8. Low level target SOCTinf is set so as to promote a heavy discharge battery 8 in order to provoke a temperature increase of battery 8. The terms "heavy" and "heavily" denote the fact that this discharge is promoted at a discharge rate which is preferably close to the maximum possible discharge rate for the battery in the instant operating conditions. For example, the electronic control unit can control the vehicle so that the discharge rate is, if possible, above 80% of the available discharge rate. It must be understood that the hypothesis here is that the battery is in a state where its available discharge rate, i.e. the power it is able to deliver, is reduced compared to its maximum discharge rate or nominal ability to deliver electric power. In practise, the vehicle will be controlled so that its traction needs are delivered to the maximum extent possible by the electric machine 4. Also, electric equipment on-board the vehicle which is supplied by the battery 8 may be operated to promote the fast discharge of the battery. Conversely, if during that initial heating phase, the vehicle needs to be slowed down, the electric machine will be controlled to deliver the maximum possible power to the battery, so that a maximum of the braking power of the vehicle is delivered by the electric machine.

As mentioned above, to meet this low target SOCTinf, one control strategy can involve reducing the ratio between the torques respectively delivered to driveline 6 by internal combustion engine 2 and electric machine 4. This means a larger proportion of electrical energy is provided to driveline 6 to move truck T, with respect to mechanical energy. This provokes a heavy decrease of the state of charge of battery 8 and a temperature increase by joule effect due to the internal resistance of the battery.

Temperature T8 is preferably continuously measured or estimated during the discharge of battery 8. Once the battery reaches state of charge low target SOCTinf, at a time t2, the target is for example maintained at low target SOCTinf until temperature T8 overcomes first threshold Ti at a time t3.

At time t3, state of charge target can be raised, preferably progressively, to nom operation state of charge target SOCTn. At a time t4, state of charge target is back to normal value SOCTn, once battery 8 has reached a second threshold. Tsup corresponding to the optimal operating temperature of battery 8. The operation of truck T then goes on as usual.

It will appear to the skilled man in the art that the method according to the invention can be implemented fully on-board a vehicle equipped with means to perform all of the above mentioned steps. On the other hand, the method can also be implemented in a partly off-board manner where at least some steps of the method are carded out by systems which are outside of the vehicle. In such cases, information may be exchanged between the outside systems and the vehicle, preferably through wireless remote communications means well known in the art. As an example, the step of estimating the temperature at the beginning of the next mission can be carried out by an external provider and the information can be sent, possibly upon a dedicated request, to the vehicle, for example through the back-office system of an company operating the vehicle via a GPRS telecommunication system. Similarly, the determination of the end of the mission for the vehicle can be performed by such back-office system.

The invention claimed is:

1. Hybrid automotive vehicle comprising
an internal combustion engine,
an electric machine connected to an energy storage system,
each of the internal combustion engine and the electric machine being adapted to deliver torque to a driveline of the vehicle,
means to estimate, during a mission of the vehicle, a temperature of the energy storage system at a beginning of a next mission of the vehicle,
means to determine if the current mission of the vehicle is about to end,
means to charge the energy storage system, subsequent to the determining means determining that the vehicle is approaching the end of the mission, on a basis of the temperature estimation before an end of a current mission of the vehicle, if the estimated temperature is below a threshold value, and
means to discharge the energy storage system at a beginning of a next mission of the vehicle before or after a starting phase of the internal combustion engine to meet a low target state of charge lower than a normal operating state of charge used when the temperature estimated is above the threshold value and once the energy storage system reaches the low target state of charge, maintain the state of charge around the low target state of charge until temperature exceeds the threshold value.

2. Hybrid, automotive vehicle according claim 1, comprising an electronic control unit adapted to control a state of charge target of the energy storage system.

3. Hybrid automotive vehicle according to claim 2, wherein the electronic control unit is adapted to control a ratio between the torque delivered to the driveline by the internal combustion engine and the torque delivered to the driveline by the electric machine.

4. Hybrid automotive vehicle according to claim 1, comprising a temperature sensor adapted to measure the temperature of the energy storage System.

5. Method for controlling a hybrid automotive vehicle, equipped with an internal combustion engine, and an electric machine connected to an energy storage system, each of the internal combustion engine and the electric machine being adapted to deliver torque to a driveline of the vehicle, wherein the method comprises at least the following steps:
a) during a mission of the vehicle, estimating a temperature of the energy storage system at a beginning of a next mission of the vehicle;
a1) determining that the vehicle is approaching the end of the mission;
b) if the temperature estimated at step a) is below a threshold value, recharging, subsequent to determining that the vehicle is approaching the end of the mission and prior to the vehicle reaching the destination, the energy storage system to store an amount of electrical energy, wherein the amount of electrical energy to be stored in energy storage system is determined depending on the temperature estimated at step a) and such that a discharge of the amount of electrical energy can heat up the energy storage system from the temperature estimated at step a) to a higher temperature;
c) if the energy storage system has been recharged at step b), then, at a beginning of a next operating period of the vehicle, discharging the energy storage system, wherein at step c) the discharge is conducted to meet a low target state of charge lower than a normal operating state of charge used when the temperature estimated at step a) is above the threshold value, the energy storage system is discharged, and once the energy storage system reached the low target state of charge, the state of charge is maintained around the low target state of charge until temperature exceeds the threshold value.

6. Method according to claim 5, wherein if the temperature estimated at step a) below the threshold value then recharging the energy storage system at step b) with a state of charge target higher than a normal operating state of charge used when the temperature estimated at step a) is above the threshold value.

7. Method according, to claim 5, wherein at step c), the energy storage system is discharged by reducing a ratio between the torque delivered to the driveline by the internal combustion engine and the torque delivered to the driveline by the electric machine.

8. Method according to claim 5, comprising, after step c), further steps of:
d) measuring or estimating the temperature of the energy storage system, e) if the temperature measured or estimated at step d) is superior to a threshold temperature value, adjusting a state of charge target of the energy storage system to a normal value.

9. Method according to claim 5, wherein at step b), recharging of the energy storage system is performed by increasing a state of charge target of the energy storage system.

10. Method according to claim 5 wherein at step b), a given amount of the torque delivered by the internal combustion engine is converted by the electrical machine into electrical energy and stored in the energy storage system.

11. Method according to claim 5, wherein at step a), the estimation is made on a basis of weather forecast data.

12. Method according to claim 5, wherein at step a), the estimation is made on a basis of weather statistic data.

13. Method according to claim 5, wherein at step a1), determination is made by geographically locating the vehicle with respect to a predefined trip.

14. Method according to claim 5, wherein at step a1), determination is made by comparing a distance covered by the vehicle during the current mission to an average distance covered during missions of the vehicle.

15. Method according to claim 5, wherein at step a1), determination is made through a device triggered by a driver of the vehicle.

16. Method for controlling a hybrid automotive vehicle, equipped with an internal combustion engine, and an electric machine connected to an energy storage system, each of the internal combustion engine and the electric machine being adapted to deliver torque to a driveline of the vehicle, wherein the method comprises at least the following steps:
- a) during a mission of the vehicle, estimation of a temperature of the energy storage system at a beginning of a next mission of the vehicle;
- a1) maintaining a normal state of charge (SOC) target during a major portion of the mission;
- a2) determining if the mission of the vehicle is about to end;
- b) after step a2), if the temperature estimated at step a) is below a threshold value, recharging, before an end of a current mission of the vehicle, the energy storage system to store an amount of electrical energy, wherein the amount of electrical energy to be stored in energy storage system is determined depending on the temperature estimated at step a) and such that a heavy discharge of the amount of electrical energy can heat up the energy storage system from the temperature estimated at step a) to a higher temperature at which the energy storage system can exchange more electrical power with the electric machine;
- c) if the energy storage system has been recharged at step b), then, at a beginning of a next operating period of the vehicle heavily discharging the energy storage system, wherein at step c) the discharge is conducted to meet a low target state of charge lower than a normal operating state of charge used when the temperature estimated at step a) is above the threshold value, the energy storage system is discharged, and once the energy storage system reached the low target state of charge, the state of charge is maintained around the low target state of charge until temperature exceeds the threshold value.

17. Method according to claim 16, comprising recharging the energy storage system at step b) to a modified state of charge target (SOCTsup) which is set to store enough energy such that discharge of battery at step c) induces a temperature increase sufficient to improve delivery of electrical energy to electric equipment of the vehicle.

18. Method according to claim 16, comprising setting a state of charge target that is lower than the SOC at step c).

19. Method according to claim 16, wherein at step a2), the determination is made by geographically locating the vehicle with respect to a predefined trip.

20. Method according to claim 16 wherein at step a2), the determination is made by comparing a distance covered by the vehicle during the current mission to an average distance covered during missions of the vehicle.

21. Method for controlling a hybrid automotive vehicle, equipped with an internal combustion engine, and an electric machine connected to an energy storage system, each of the internal combustion engine and the electric machine being adapted to deliver torque to a driveline of the vehicle, wherein the method comprises at least the following steps:
- a) during a mission of the vehicle that ends when the vehicle reaches a destination, prior to reaching the destination, estimating a temperature of the energy storage system at a beginning of a next mission of the vehicle;
- a1) determining that the vehicle is approaching the end of the mission;
- b) if the temperature estimated at step a) is below a threshold value, recharging, subsequent to determining that the vehicle is approaching the end of the mission and prior to the vehicle reaching the destination, the energy storage system to store an amount of electrical energy, wherein the amount of electrical energy to be stored in energy storage system is determined depending on the temperature estimated at step a) and such that a heavy discharge of the amount of electrical energy can heat up the energy storage system from the temperature estimated at step a) to a higher temperature at which the energy storage system can exchange more electrical power with the electric machine;
- c) if the energy storage system has been recharged at step b), then, at a beginning of a next operating period of the vehicle, heavily discharging the energy storage system, wherein at step c) the discharge is conducted to meet a low target state of charge lower than a normal operating state of charge used when the temperature estimated at step a) is above the threshold value, the energy storage system is discharged, and once the energy storage system reached the low target, state of charge, the state of charge is maintained around the low target state of charge until temperature exceeds the threshold value.

* * * * *